United States Patent [19]

Laprade et al.

[11] 4,102,313

[45] Jul. 25, 1978

[54] DEVICE FOR THE REGULATION OF THE AIR-FUEL MIXTURE IN INTERNAL COMBUSTION ENGINES

[76] Inventors: Bernard R. Laprade; Xavier J. Laprade, both of Arudy; Pierre J. Gele, 3, rue Vaussenat, Tarbes, all of France

[21] Appl. No.: 696,189

[22] Filed: Jun. 15, 1976

[30] Foreign Application Priority Data

Jun. 18, 1975 [FR] France ................................ 75 19077

[51] Int. Cl.² ............................................. F02M 7/20
[52] U.S. Cl. ........................ 123/119 EC; 123/32 EE; 123/120; 123/119 D; 123/124 B
[58] Field of Search ............... 123/26, 32 EA, 32 EE, 123/124 B, 119 R, 119 D, 119 DB, 119 EC; 60/285

[56] References Cited

U.S. PATENT DOCUMENTS

| | | | |
|---|---|---|---|
| 2,416,907 | 3/1947 | Chandler | 123/119 R |
| 3,677,241 | 7/1972 | Gele et al. | 123/124 B |
| 3,759,232 | 9/1973 | Wahl et al. | 123/32 EE |

*Primary Examiner*—Samuel Feinberg
*Attorney, Agent, or Firm*—Finnegan, Henderson, Farabow & Garrett

[57] ABSTRACT

A device for the regulation of the air-fuel mixture of internal combustion engines comprises a fuel gas or air inlet opening into the inlet manifold downstream of the throttle valve, the gas inlet being controlled by a valve which is controlled by a capsule containing a movable member such as a membrane or piston subject to the partial vacuum prevailing in the manifold, the partial vacuum being modulated as a function firstly of the inlet air flowrate and secondly of the composition of the exhaust gases.

7 Claims, 2 Drawing Figures

DEVICE FOR THE REGULATION OF THE AIR-FUEL MIXTURE IN INTERNAL COMBUSTION ENGINES

BACKGROUND OF THE INVENTION

1. Field of the Invention

The invention relates to a device for the regulation of the air-fuel mixture in an internal combustion engine.

2. Description of the Prior Art

It is a known practice in a general way to effect the regulation of the air-fuel mixture of internal combustion engines (λ ratio) as a function of the composition of the exhaust gases by means of a probe arranged in the exhaust pipe which supplies a current variable with the composition of the exhaust gases. The electrical information from this probe is used by means of any suitable electronic device to regulate the λ ratio by acting on one or more parameters on which this ratio depends: air throughput, fuel throughput, introduction of additional air, modification of the petrol inlet orifice, pressure on the carburettor body etc.

All these devices differ from one another in their method of application, their complexity and their efficiency at all rates, and present research is tending to produce more and more simple solutions, permitting lower and lower cost prices to be achieved or an increased efficiency at all rates.

SUMMARY OF THE INVENTION

The present invention relates to a device of this type. This device is characterised in that it comprises a gas inlet opening into the inlet manifold downstream of the throttle valve (butterfly) for the control of the air flow, this gas inlet being controlled by a valve controlled by a capsule containing a movable member held by an elastic return device is subject to the partial vacuum prevailing in the manifold, this partial vacuum being itself modulated firstly as a function of the air flowrate in the inlet pipe and secondly as a function of the information from a probe in the exhaust pipe by an electromagnetic valve connecting the capsule to the atmosphere.

The expression "a capsule containing a movable member" is intended to mean a device having a movable wall such as a membrane or sliding piston separating two chambers in which there prevail different pressures at least one of which is variable.

According to a first embodiment of the invention, the modulation as a function of the air flowrate is effected by means of a second capsule connected to the throat of a venturi situated in the inlet pipe, upstream of the throttle valve butterfly and controlling a variable throttle arranged in the pipe connecting the first capsule to the manifold.

According to a second embodiment of the invention, the modulation as a function of the air flowrate is effected by the combination of a second capsule connected to the inlet manifold downstream of the throttle valve butterfly and controlling a variable throttle arranged in a pipe connecting the first capsule to the manifold, electronic information as a function of the speed of the engine being supplied elsewhere to the electronic device for the control of the electromagnetic valve, subject to the probe.

A buffer volume is preferably interposed between the electromagnetic valve and the capsule for the control of the valve; this volume plays the role of a pneumatic shock absorber.

Constrictions may be provided in the pipes connecting the capsule to the electromagnetic valve and the second capsule to the venturi or to the manifold.

DESCRIPTION OF THE PREFERRED EMBODIMENTS

Figure 1:
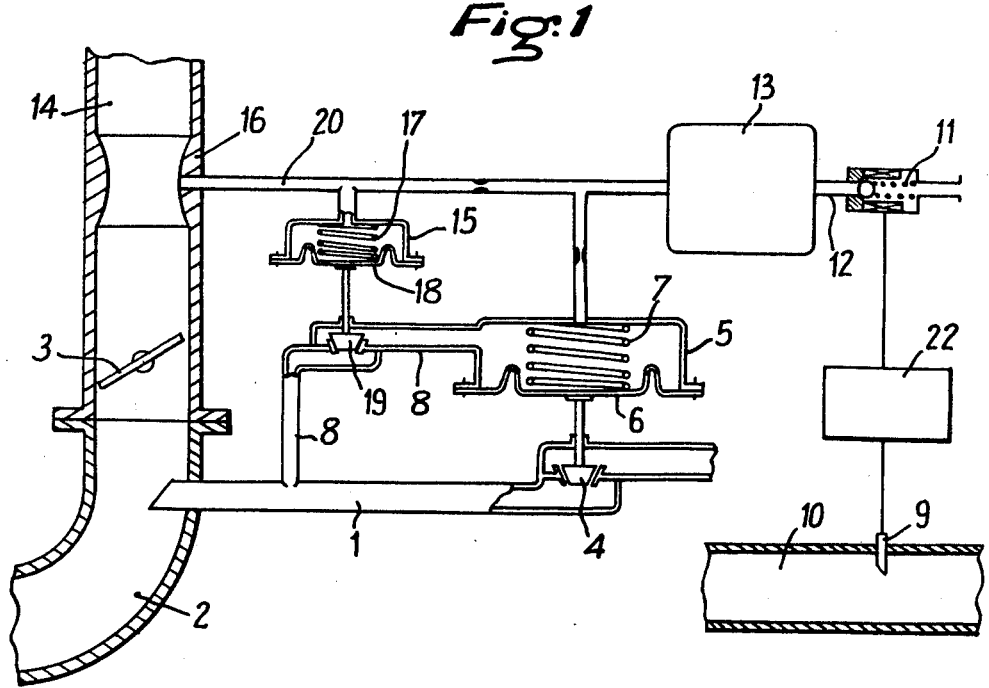
FIG. 1 shows schematically a first embodiment of the invention.

By referring to these Figures it can be seen that the device comprises a gas inlet 1 opening into the inlet manifold 2 of an internal combustion engine (not shown) downstream of the butterfly 3; the gas inlet 1 is controlled by a valve 4 controlled by the membrane capsule 5 of which the membrane 6, held by the spring 7, is subjected by the pipe 8 to the partial vacuum prevailing in the manifold 2; this partial vacuum is modulated as a function of the electrical information from a probe 9, located in the exhaust pipe 10, by an electromagnetic valve 11 arranged in a pipe 12 communicating with the atmosphere and connecting the capsule 5 to the atmosphere with the interposition of a buffer volume 13 between the capsule 5 and the electromagnetic valve 11.

The partial vacuum prevailing in the capsule 5 is also modulated as a function of the air flow in the inlet pipe 14. In the embodiment of FIG. 1 this is obtained by means of a second capsule 15, subjected through the pipe 20 to the partial vacuum prevailing at the throat of the venturi 16 located upstream of the butterfly 3, this partial vacuum acting against the spring 17, the membrane 18 of the capsule 15 controlling a valve 19 forming a variable throttle of the pipe 8.

Figure 2:
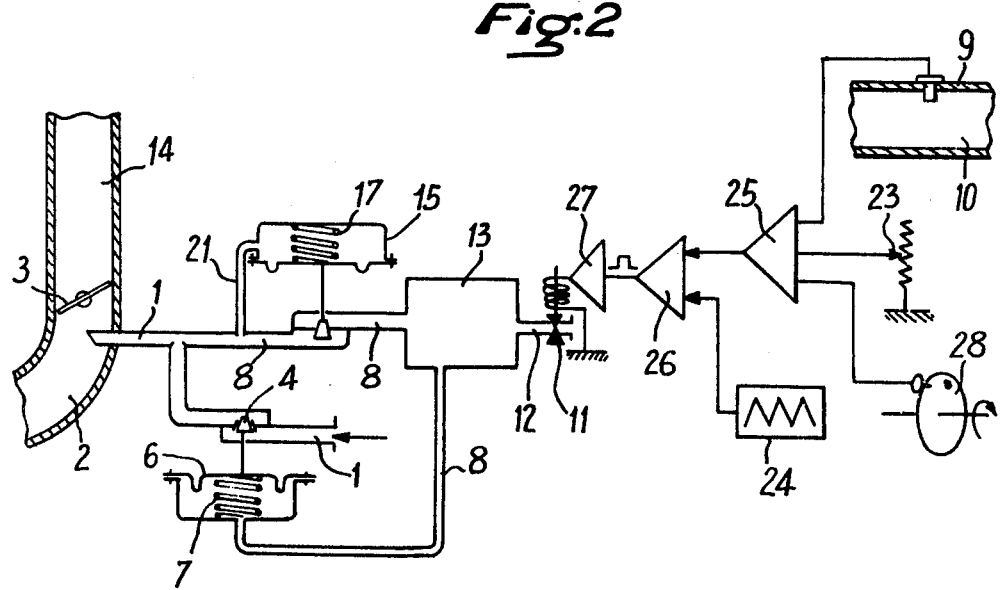
FIG. 2 shows schematically a second embodiment of the invention.

In the embodiment of FIG. 2, the second capsule 15 acting on the variable throttle 19 is subjected by the pipe 21 to the partial vacuum of the manifold 2, downstream of the butterfly 3 and in addition the electronic device 22 transforming the information from the probe 9 into impulses for the control of the electromagnetic valve 11 combines with the information from the probe 9 electrical information as a function of the speed of the engine.

As shown in FIG. 2, the electronic device 22 can be of the type described in French Pat. No. 74.18028 of 24 May 1974 in which the voltage signal from the probe 9 is compared at 25 with a variable stabilised voltage 23, the deviation obtained after amplification being compared at 26 with the impulses provided by the saw-toothed generator 24 of fixed amplitude and frequency and the signals obtained after amplification at 27 are used for the control of the electromagnetic valve 11.

According to the present application, information relating to the speed of the engine supplied by the ignition circuit or by an electronic tachometric pick-up of known type 28 is fed to the assembly, for example at the amplification stage linked to the comparator 25.

By combining information relating to the load, supplied by the capsule 15 and speed information supplied by the electronic device 22–28 flow information is obtained which serves to modulate the partial vacuum acting in the capsule 5.

The inlet 1 may be an auxiliary air inlet or a fuel gas inlet.

In the first case, the mixture entering the manifold 2 will be an air-fuel mixture of rich adjustment and the regulation according to the invention will be effected by the impoverishment of the mixture.

In the second case the mixture, entering the manifold 2 will be an air-fuel mixture of lean adjustment and the regulation according to the invention will be effected by the enrichment of the mixture.

In extreme circumstances the pipe 14 can introduce air only, the device according to the invention ensuring both the dosing and the regulation of an appropriate gaseous fuel, all other mixing devices being eliminated (carburettor). When the inlet 1 is a gas inlet, the invention provides that the regulation of the voltage 23 should be handled by the driver. In fact in the case of gaseous fuel it is not necessary to work with an air-fuel mixture close to the stoichiometric ratio and the device according to the invention can be used as a power variation by modification of the richness of the mixture. To achieve this result it is necessary to use a linear probe, i.e. one which supplies a current varying progressively as a function of the composition of the exhaust gases.

We claim:

1. A device for the regulation of the air-fuel mixture of internal combustion engines comprising a gas inlet opening into the inlet manifold downstream of the throttle valve for the control of the air flow, said gas inlet being controlled by a valve controlled by a capsule comprising a movable member held by an elastic return device, said movable member being subject to the partial vacuum prevailing in the manifold, the partial vacuum being itself modulated firstly as a function of the air flowrate in the inlet pipe and secondly as a function of the composition of the exhaust gases by an electromagnetic valve arranged in a pipe connecting the capsule to the atmosphere.

2. A device according to claim 1, wherein the modulation as a function of the air flow is effected by means of a second capsule comprising a movable member connected to the throat of a venturi situated in the inlet pipe, upstream of said throttle valve, and controlling a variable throttle arranged in the pipe connecting the first capsule to the manifold.

3. A device according to claim 2, wherein constrictions are arranged in the pipes connecting said capsules to said electromagnetic valve and said second capsule to the venturi.

4. A device according to claim 1, wherein the modulation as a function of the air flow is effected by combining a second capsule comprising a movable member connected to the inlet manifold downstream of the throttle valve and controlling a variable throttle arranged in a pipe connecting said first capsule to the manifold, electronic information as a function of the engine speed being supplied to an electronic device for the control of the electromagnetic valve.

5. A device according to claim 4, wherein constrictions are arranged in the pipes connecting said capsules to said electromagnetic valve and said second capsule to the manifold.

6. A device according to claim 1, further comprising a buffer volume interposed between the electromagnetic valve and said capsule.

7. A device according to claim 1, comprising a probe arranged in the exhaust pipe which produces a linear signal, adjustable means for producing a reference signal, and an electronic circuit which transforms said signals into impulses for the control of the electromagnetic valve.

* * * * *